United States Patent
Yamaya et al.

[11] Patent Number: 4,816,516
[45] Date of Patent: Mar. 28, 1989

[54] POLYIMIDE RESIN-FLUOROPOLYMER COMPOSITIONS

[75] Inventors: Norimasa Yamaya; Nobuhito Koga; Kenichi Baba, all of Yokohama, Japan

[73] Assignee: Mitsui Toatsu Chemicals, Inc., Tokyo, Japan

[21] Appl. No.: 63,962

[22] Filed: Jun. 19, 1987

[30] Foreign Application Priority Data

Jun. 30, 1986 [JP] Japan .................. 61-151742

[51] Int. Cl.$^4$ .................................. C08L 79/08
[52] U.S. Cl. ........................ 525/180; 525/184; 525/928
[58] Field of Search ................. 525/180, 184, 104

[56] References Cited

U.S. PATENT DOCUMENTS

| | | | |
|---|---|---|---|
| 4,065,345 | 12/1977 | Progar et al. | 156/309 |
| 4,433,104 | 2/1984 | Giles | 525/180 |
| 4,599,396 | 7/1986 | Takekoshi | 528/353 |

Primary Examiner—John C. Bleutge
Assistant Examiner—A. Carrillo
Attorney, Agent, or Firm—Fisher, Christen & Sabol

[57] ABSTRACT

This invention is a polyimide resin composition containing 100 parts by weight of polyimide having recurring units of the following formula:

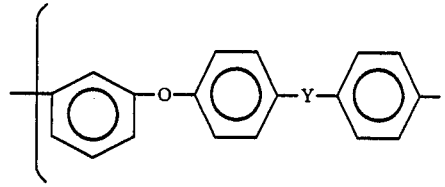

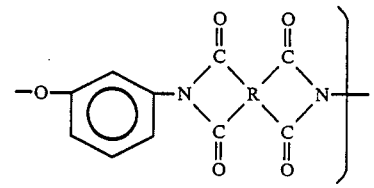

wherein Y is a bond, divalent hydrocarbon radical having from 1 to 10 carbons, hexafluorinated isopropylidene radical, carbonyl radical, thio radical, sulfinyl radical, sulfonyl radical or oxide, and R is a tetravalent radical of aliphatic radical having at least 2 carbons, alicyclic radical, monoaromatic radical, condensed polyaromatic radical, or noncondensed polyaromatic radical wherein aromatic radicals are mutually connected with a bond or a crosslinking function and from 5 to 100 parts by weight of fluororesin. The resin composition can provide molded products which are excellent in high-temperature stability, dimensional stability and mechanical strength and moreover have a low friction coefficient and good wear resistance. Therefore, the composition is useful as the material for electric and electronic devices, precision instrument parts etc.

Polyimide of this invention can be prepared from aromatic diamines and tetracarboxylic acid dianydrides. Suitable aromatic diamines are 4,4'-bis(3-aminophenoxy)biphenyl, 2,2-bis[4-(3-aminophenoxy)phenyl]propane, bis[4-(3aminophenoxy)phenyl] sulfide etc. Suitable tetracarboxylic acid dianhydrides are pyromellitic dianhydride and 3,3', 4,4'-benzophenonetetracarboxylic dianhydride.

Representative fluororesin which can be used in this invention is polytetrafluoroethylene.

8 Claims, No Drawings

POLYIMIDE RESIN-FLUOROPOLYMER COMPOSITIONS

BACKGROUND OF THE INVENTION

The present invention relates to a novel polyimide resin composition having excellent sliding property.

Polyimides obtained by reacting tetracarboxylic acid dianhydrides with diamines are hereafter expected for use in a variety of sliding parts because of its various kinds of excellent properties and good high-temperature stability as well as its prominent wear resistance.

Many polyimides which have so far been developed exhibit outstanding properties. Even polyimides, however, which have excellent sliding property and high-temperature stability do not have a definite glass transition temperature. Therefore it is difficult to process these polyimides by injection molding and special procedures are required for preparing products having desired shapes. On the other hand, the polyimide resin having a low glass transition temperature and prominent processability is restricted in the upper limit of its application temperature as the sliding parts. Thus the performance of polyimide has both merits and drawbacks.

BRIEF SUMMARY OF THE INVENTION

An object of this invention is to provide a novel polyimide resin composition for use as the materials of high performance sliding parts. The sliding parts are excellent in the high-temperature stability and solvent resistance as well as the sliding property. Furthermore they can be molded in a variety of shapes by a relatively simple injection molding technology.

The object of this invention is, more specifically, to provide the polyimide resin composition having extraordinary low coefficient of friction together with outstanding wear resistance and capable of being used for the precision instrument parts. Suitable instrument parts which may be prepared include, for example, various types of bearing materials, piston rings, piston skirts, gears, hoppers, slides, various kinds of pump components, cams, rollers, packings and many types of valve parts.

DETAILED DESCRIPTION OF THE INVENTION

The present inventors have investigated extensively to achieve the above object. Consequently, they have found that a polyimide resin composition comprising a novel polyimide and a specific amount of a fluororesin is particularly effective. Thus the present invention has been completed.

That is, the present invention is a polyimide resin composition which comprises 100 parts by weight of a polyimide having recurring units of the formula:

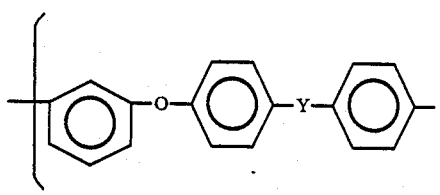

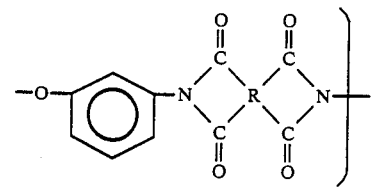

wherein Y is a radical selected from the group consisting of a bond, divalent hydrocarbon radical having from 1 to 10 carbon atoms, hexafluorinated isopropylidene radical, carbonyl radical, thio radical, sulfinyl radical, sulfonyl radical and oxide, and R is a tetravalent radical selected from the group consisting of aliphatic radical having 2 and more carbon atoms, alicyclic radical, monoaromatic radical, condensed polyaromatic radical, and non-condensed polyaromatic radical wherein aromatic radicals are mutually connected with a bond or a crosslinking function and from 5 to 100 parts by weight of a fluororesin.

The polyimide resin which can be used in the present invention is polyimide prepared by reacting an ether-diamine represented by the following formula:

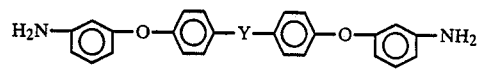

wherein Y is a radical selected from the group consisting of a bond, divalent hydrocarbon radical having from 1 to 10 carbon atoms, hexafluorinated isopropylidene radical, carbonyl radical, thio radical, sulfinyl radical, sulfonyl radical and oxide with a tetracarboxylic acid dianhydride.

Suitable ether-diamines which can be used include bis[4-(3-aminophenoxy)phenyl]methane, 1,1-bis[4-(3-aminophenoxy)phenyl]ethane, 1,2-bis[4-(3-aminophenoxy)phenyl]ethane, 2,2-bis[4-(3-aminophenoxy)phenyl]propane, 2,2-bis[4-(3-aminophenoxy)phenyl]butane, 2,2-bis-[4-(3-aminophenoxy)pheynyl]-1,1,1,3,3,3-hexafluoropropane, 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfoxide, bis[4-(3-aminophenoxy)phenyl]sulfone and bis]4-(3-aminophenoxy)phenyl]ether.

Representative diamines which can be particularly preferred in the present function include 2,2-bis[4-(3-aminophenoxy)phenyl]propane, 4,4'-bis(3-aminophenoxy)biphenyl and bis[4-(3-aminophenoxy)phenyl]sulfide. These ether-diamines may be used alone or in mixtures of two or more.

Tetracarboxylic dianhydrides for use in the method of this invention have the following formula:

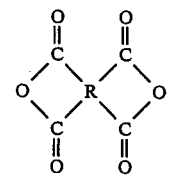

wherein R is a tetra-valent radical selected from the group consisting of aliphatic radical having not less than two carbons, cycloaliphatic radical, monoaromatic radical, condensed polyaromatic radical, and non-condensed polyaromatic radical wherein aromatic radicals are mutually connected with a bond or a crosslinking function.

Illustrative dianhydrides which can be used in the method include, for example, ethylenetetracarboxylic dianhydride, cyclopentanetetracarboxylic dianhydride, pyromellitic dianhydride, 3,3′,4,4′-benzophenonetetracarboxylic dianhydride, 2,2′,3,3′-benzophenonetetracarboxylic dianhydride, 3,3′,4,4′-biphenyltetracarboxylic dianhydride, 2,2′3,3′-biphenyltetracarboxylic dianhydride 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride.

Representative dianhydrides which can be particularly preferred in this invention include pyromellitic dianhydride, 3,3′,4,4′-benzophenonetetracarboxylic dianhydride, 3,3′,4,4′-biphenyltetracarboxylic dianhydride, 2,2-bis(3,4-dicarboxyphenyl)propane dianhydride, bis(3,4-dicarboxyphenyl)ether dianhydride, and bis(3,4-dicarboxyphenyl)sulfone dianhydride.

These tetracarboxylic dianhydrides may be used alone or in mixtures of two or more.

The ether-diamine and the tetracarboxylic dianhydride are reacted by a known method to give a polymeric acid represented by the following formula:

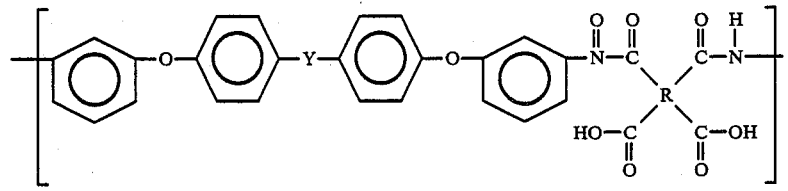

wherein Y is a radical selected from the group consisting of a bond, divalent hydrocarbon radical having from 1 to 10 carbon atoms, hexafluorinated isopropylidene radical, carbonyl radical, thio radical, sulfinyl radical, sulfonyl radical and oxide, and R is a tetravalent radical selected from the group consisting of aliphatic radical having 2 and more carbon atoms, alicyclic radical, monoaromatic radical, condensed polyaromatic radical, and non-condensed polyaromatic radical wherein aromatic radicals are mutually connected with a bond or a crosslinking function, and the polymeric acid is successively subjected to dehydration and ring-closing reaction to obtain polyimide.

The term fluororesin which can be simultaneously used with polyimide in the present invention means synthetic high polymers containing fluorine atoms in the molecule. When compared with other synthetic resin, the fluororesin excels in the high-temperature stability, chemical resistance and electrical properties (high-frequency properties in particular), and provides a specific low friction property and non-tachiness.

Representative fluororesin which can be used in the present invention is those having the following rational formulas and at least one of the resin is used.

The fluororesin includes, for example, (1) $\text{-(CF}_2\text{CF}_2\text{)}_n\text{-}$: Polytetrafluoroethylene (PTFE),
(2) $\text{-(CF}_2\text{CF}_2\text{)}_n\text{[CF(CF}_3\text{)CF}_2\text{]}_p\text{-}$: Tetrafluoroethylene hexafluoropropylene copolymer (FEP),
(3) $\text{-(CF}_2\text{CF}_2\text{)}_n\text{[CF(OC}_m\text{H}_{2m+1}\text{)CF}_2\text{]}_p\text{-}$: Tetrafluroethylene perfluoroalkylvinylether copolymer (PEA),
(4) $\text{-(CH}_2\text{CH}_2\text{)}_n\text{(CF}_2\text{CF}_2\text{)}_p\text{-}$: Ethylene tetrafluoroethylene copolymer (ETFE),
(5) $\text{-(CH}_2\text{CH}_2\text{)}_n\text{(CFClCF}_2\text{)}_p\text{-}$: Ethylene chlorotrifluoroethylene copolymer (ECTFE) and
(6) $\text{-(CF}_2\text{CH}_2\text{)}_n\text{-}$: Polyvinylidene fluoride (PVDF).

Polytetrafluoroethylene (PTFE) is used most preferably among the fluororesin in this invention. The polytetrafluoroethylene which is commercially available includes, for example, TEFLON KPL-610 (a trade mark of Du Pont·Mitsui Fluoro Chemicals Co., Ltd.) The fluororesin which may be used in this invention is usually powder and its grain size is in the range of about 1 to about 25 microns, preferably about 5 to about 10 microns.

The fluororesin in this invention is contained in an amount of from 5 to 100 parts by weight, preferably from 10 to 60 parts by weight per 100 parts by weight of the polyimide. When the content is less than the above-mentioned range, the composition of this invention cannot be provided with the desired properties. On the other hand, when the content exceeds this range, the composition is hardly improved its properties and provides rather ill effect on the wear resistance and mechanical strengths of the sliding materials prepared from the composition.

The polyimide composition in the practice of this invention can be prepared by the usually known methods and preferably by the following methods in particular.

(1) The polyimide powder and the fluororesin are premixed by using a mortar, Henschel mixer, drum blender, tumbler blender, ball mill, ribbon blender etc. The resultant mixture is then kneaded with an usually known fusion mixer or hot roll to form pellets or powder.

(2) The polyimide powder is dissolved or suspended in an organic solvent in advance. The fluororesin is added to the resulting solution or suspension and uniformly dispersed. Then the solvent is removed by heating in a hot air oven. The residual mass is pelletized or powdered.

The organic solvents used in this method include, for example, N,N-dimethylformamide, N,N-dimethylacetamide, N,N-diethylacetamide, N,N-dimethyl-methoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, m-cresol, p-chlorophenol and anisole. These solvents can be used alone or in mixtures of two or more.

(3) The polyamic acid precursor of polyimide of this invention is dissolved in the aforesaid organic solvent. The fluororesin is suspended in the resultant solution and followed by subjecting to a heat treatment at a temperature of from 100° to 400° C. or a chemical imidization with an usually available imidizing agent. The solvent is then removed and the residue is pelletized or powdered.

Besides the polyimide resin composition of this invention may be added with at least one of said solid lubricant. Suitable solid lubricants which may be used include, for example, molybdenum disulfide, graphite, boron nitride, lead monoxide and lead powder.

In addition, one and more of reinforcing materials may be added. Representative reinforcing materials which may be added include, for example, glass fibre, carbon fibre, aromatic polyamide fibre, potassium titanate fibre, and glass beads.

Furthermore, the composition of this invention may be added with one or more of normally available additives in the range where the object of this invention is unharmed. Illustrative additives include antioxidants, heat stabilizers, ultra violet absorbers, flame retardants, auxiliary flame retardants, antistatic agents, lubricants, and colorants.

The polyimide resin composition of this invention may be molded by known processing methods such as injection molding, extrusion molding, rotation molding etc. and used for practical application.

EXAMPLES

The present invention will be hereinafter illustrated with Examples.

Synthetic Example 1

A 3 l glass reaction vessel was charged with 186 grams (1.0 mol) of 4,4'-dihydroxybiphenyl, 438 grams (2.6 mols) of m-dinitrobenzene, 363 grams of potassium carbonate and 2,000 ml of N,N-dimethylformamide. The mixture was reacted at a temperature of 140°-150° C. for 16 hours. After completing the reaction, the resultant mixture was cooled and filtered to remove potassium nitrite. The solvent was distilled off from the filtrate under reduced pressure. The residue was cooled to 65° C., added with 2,000 ml of methanol and stirred for an hour. The resulting crystals were filtered, washed with water, washed with methanol and dried to obtain 426 grams (99.5% yield) of 4,4'-bis(3-nitrophenoxy)-biphenyl as brown crystals.

In the next step, a 1 l glass reaction vessel was charged with 100 grams (0.23 mol) of crude 4,4'-bis(3-nitrophenoxy)biphenyl, 10 grams of active carbon, 1 gram of ferric chloride hexahydrate and 500 ml of 2-methoxyethanol. The mixture was stirred for 30 minutes under reflux and then added dropwise with 46 grams (0.92 mol) of hydrazine hydrate during 3 hours at 70°-80° C. The reaction was terminated by stirring for 5 hours at 70°-80° C. after ending the dropwise addition. The reaction mixture was cooled, filtered to remove the catalyst and poured into 500 ml of water. The separated crystals were filtered, added with 48 grams of 35% hydrochloric acid and 540 ml of 50% isopropyl alcohol and warmed. The solution thus obtained was allowed to cool. The separated 4,4'-bis(3-aminophenoxy)biphenyl hydrochloride was filtered, added with 540 ml of 50% isopropyl alcohol and warmed. The solution thus obtained was added with 5 grams of active carbon, filtered and neutralized with aqueous ammonia. The separated crystals were filtered, washed with water and dried to give 72.0 grams (85% yield) of 4,4'-bis(3-aminophenoxy)biphenyl as colorless crystals having a melting point of 144°-146° C. The purity was 99.6% according to high-speed liquid chromatography.

Elementary analysis: $C_{24}H_{20}N_2O_2$

|  | C | H | N |
|---|---|---|---|
| Calculated (%) | 78.26 | 5.43 | 7.61 |
| Found (%) | 78.56 | 5.21 | 7.66 |

MS: 368 (M$^+$), 340, 184
IR (KBr, cm$^{-1}$): 3400 and 3310 (amino group), 1240 (ether linkage).

Synthetic Example 2

A 1 l glass reaction vessel was charged with 85.6 grams (0.375 mol) of 2,2-bis(4-hydroxyphenyl)propane, 151.2 grams (0.9 mol) of m-dinitrobenzene, 124.6 grams of potassium carbonate and 660 ml of N,N-dimethyl formamide. The mixture was reacted for 10 hours at a temperature for 140°-150° C. After completing the reaction, the resultant mixture was cooled and filtered to remove potassium nitrite. The solvent was distilled off from the filtrate under reduced pressure. The residue was cooled to 65° C., added with 450 ml of methanol and stirred for an hour. The resulted crystals were filtered, washed with water, washed with methanol, and dried to obtain 164.8 grams (93.5% yield) of 2,2-bis[4-(3-nitrophenoxy)phenyl]propane as brown crystals.

In the next step, a 500 ml glass reaction vessel was charged with 100 grams (0.21 mol) of 2,2-bis[4-(3-nitrophenoxy)phenyl]propane, 10 grams of active carbon, 1 gram of ferric chloride hexahydrate and 300 ml of 2-methoxyethanol. The mixture was stirred for 30 minutes under reflux and then added dropwise with 42 grams (0.84 mol) of hydrazine hydrate during 2 hours at 70°-80° C. The reaction mixture was further stirred for 5 hours at 70°-80° C., cooled, filtered to revove the catalyst, and 150 ml of 2-methoxyethanol was distilled off. The residue thus obtained was added with 270 grams of 20% aqueous hydrochloric acid solution and further 30 grams of sodium chloride, and cooled to 20°-25° C. with stirring. The separated crystals were filtered and neutralized in 30% ispropyl alcohol with aqueous ammonia. Thus separated crystals were filtered, washed with water, dried and recrystallized from a solvent mixture of benzene and n-hexane.

2,2-bis[4-(3-aminophenoxy)phenyl]propane thus obtained was 69.2 grams (75% yield) and was colorless crystals having a melting point of 106°-108° C. The purity was 99.6% according to high-speed liquid chromatography.

Elementary analysis: $C_{24}H_{20}N_2O_2$

|  | C | H | N |
|---|---|---|---|
| Calculated (%) | 79.02 | 6.34 | 6.83 |
| Found (%) | 79.21 | 6.40 | 6.71 |

MS: 470 (M+), 455 (M-CH$_3$)+

IR (KBr, cm$^{-1}$): 3460 and 3370 (amino group) 1220 (ether linkage)

Synthetic Example 3

A 3 l glass reaction vessel was charged with 218 grams (1 mol) of bis(4-hydroxyphenyl)sulfide, 403 grams (2.4 mols) of m-dinitrobenzene, 331 grams (2.0 mols) of potassium carbonate and 2.5 l of N,N-dimethylformamide. The mixture was reacted for 20 hours at at a temperature of 140°–150° C. After completing the reaction, the resultant mixture was coold, filtered and the solvent was distilled from the filtrate under reduced pressure. The residue thus obtained was added with 800 ml of methanol and stirred for an hour. The crystals obtained was filtered, washed with methanol and dried to give 429 grams (92.3% yield) of bis[4-(3-nitrophenoxy)phenyl]sulfide as crystals.

In the next step, 428 grams (0.93 mol) of the crude intermediate was charged in a 3 l glass reaction vessel and added with 22.6 grams of active carbon, 0.0 gram of ferric chloride hexahydrate and 1.5 l of 2-methoxyethanol. The mixture was stirred for 30 minutes under reflux, and then 155.2 grams (3.1 mols) of hydrazine hydrate was added dropwise during 2 hours at 110°–115° C. The resultant mixture was further stirred for 3.5 hours under reflux, cooled and filtered to remove the catalyst. The filtrate was concentrated under reduced pressure and added with 205 ml of 35% hydrochloric acid, 1120 ml of water and 480 ml of isopropyl alcohol. The mixture was warmed to obtain a solution, added with 20 grams of active carbon and hot filtered. The filtrate was then added with 112 grams of sodium chloride, cooled and separated hydrochloride crystals was filtered. The hydrochloride crystals were neutralized with aqueous ammonia by a normal procedure to obtain 265 grams (66% yield) of desired bis[4-(3-aminophenoxy)phenyl]sulfide as colorless crystals having a melting point of 112.4°–113.4° C. (corr). The purity was higher than 99.9%.

Elementary analysis: C$_{24}$H$_{20}$N$_2$O$_2$S

|  | C | H | N | S |
| --- | --- | --- | --- | --- |
| Calculated (%) | 71.97 | 5.03 | 7.00 | 8.01 |
| Found (%) | 71.90 | 4.54 | 6.92 | 7.72 |

MS (FD): 470 (M+)

IR (KBr, cm$^{-1}$): 3390 and 3300 (amino group), 1220 (ether linkage)

EXAMPLES 1–4

A reaction vessel equipped with a stirrer, reflux condenser and nitrogen inlet tube was charged with 36.8 kilograms (100 mols) of 4,4'-bis(3-aminophenoxy)biphenyl and 175.8 kilograms of N,N-dimethylacetamide. The mixture was added by portions with 21.8 kilograms (100 mols) of pyromellitic dianhydride at room temperature under nitrogen atmosphere with care to prevent temperature rise of the mixture, and stirred for 20 hours at room temperature. The polyamic acid thus obtained had an inherent viscosity of 2.47 dl/g.

In the next step, 150 kilograms of above polyamic acid solution was added with 337.5 kilograms of N,N-dimethylacetamide, warmed to 70° C. with stirring under nitrogen atmosphere, and added dropwise with 26.1 kilograms (26 mols) of acetic anhydride and 9.50 kilograms (9 mols) of triethylamine. Yellow polyimide powder was started to separate about 10 minutes after terminating the dropwise addition, further stirred for 2 hours with warming, and then hot filtered. The polyimide powder thus obtained was washed with methanol and dried at 150° C. for 5 hours under reduced pressure to afford 34.5 kilograms (98% yield) of polyimide powder.

To 100 parts by weight of the polyimide powder above obtained, fluororesin (commercially available TEFLON KPL-610, a trade mark of Du Pont·Mitsui Fluoro Chemicals Co., Ltd.) was added in an amount illustrated in Table 1 and mixed in a Henschel mixer (from Kawada Seisakusho). The resultant mixture was kneaded in a molten state at a temperature of 380° C. in a single screw extruder having 30 mm in aperture. The strands thus obtained were air cooled and cut into pellets.

The pellets obtained were injection molded with an Arburg injection molding machine having a maximum mold clamping force of 35 tons under the conditions; injection pressure of 500 kg/cm$^2$, cylinder temperature of 400° C., and mold temperature of 180° C. Specimens for measuring the sliding properties were thus prepared. As to the sliding properties, friction coefficient and wear coefficient were measured and results obtained are illustrated in Table 1.

The friction coefficient was measured by rubbing against stainless steel 45C under a sliding load of 10 kg/cm$^2$ with a sliding velocity of 6 m/min. The wear coefficient was measured by rubbing against stainless steel 45C under a sliding load of 5 kg/cm$^2$ with a sliding velocity of 100 m/min.

EXAMPLE 5

To 100 parts by weight of the polyimide powder obtained by the same procedure as in Example 1, 150 parts by weight of N,N-dimethylacetamide were added to make a suspension. The suspension was further added and uniformly dispersed with 30 parts by weight of the fluororesin having an average diameter of 10 microns (TEFLON KPL-610). After preliminary drying the resultant mixture in a hot air oven at 200° C. for 20 hours, it was dried in a vacuum desiccator at 150° C. for 5 hours under reduced pressure in order to completely remove the N,N-dimethylacetamide solvent. The powder mixture thus obtained was pelletized by the same procedure as in Examples 1 to 4 to give specimens for testing the physical properties. The physical properties were tested by the same procedures as in Examples 1 to 4 and the results are illustrated in Table 1.

EXAMPLE 6

To 400 parts by weight of the polyamic acid solution obtained by the same procedure as in Examples 1 to 4, 30 parts by weight of the fluororesin used in Examples 1 to 4 (TEFLON KPL-610) were added and uniformly dispersed. The resultant mixture was treated by the same procedure as in Example 5 to obtain the powder mixture. Then the procedure of Example 5 was repeated on the powder mixture to give the results illustrated in Table 1.

EXAMPLES 7–9

To 100 parts by weight of the polyimide powder derived from the diamine and the tetracarboxylic acid dianhydride which are illustrated in Table 1, the fluororesin used in Examples 1 to 4 (TEFLON: KPL-610) was added in an amount illustrated in Table 1. The same procedures as in Examples 1 to 4 were carried out to obtain the results in Table 1.

EXAMPLES 10-18

To 100 parts by weight of the polyimide powder derived from the diamine and tetracarboxylic acid dianhydride which are illustrated in Table 1, 10 parts by weight of the fluororesin used in Examples 1 to 4 (TEFLON: KPL-610) were added. The mixture was further added with the following solid lubricants and reinforcing materials respectively in an amount illustrated in Table 1. Solid lubricants were lead powder, graphite, boron nitride and molybdenum disulfide, having grain size of 200 to 300 meshes. Reinforcing materials were silane treated glass fibre having 3 mm in fibre length and 13 microns in fibre diameter (Trade Mark; CS-3PE-476S; from Nitto Boseki Co.), carbon fibre having 3 mm in fibre length and 12 microns in fibre diameter (Trade Mark; TORAYCA, from Toray Industries), aromatic polyamide fibre having 3 mm in fibre length (Trade Mark; KEVLAR, from E. I. Du Pont de Nemours & Co.), and potassium titanate fibre having 20 microns in average fibre length and 0.2 micron in sectional diameter (Trade Mark; TISMO-D from Ohtsuka Chemicals Co.). The resultant compositions were respectively treated by the same procedure as in Examples 1 to 4. The results obtained are illustrated in Table 1.

COMPARATIVE EXAMPLES 1-3

To 100 parts by weight of the polyimide powder derived from the diamine and the tetracarboxylic acid dianhydride which are illustrated in Table 1, the fluororesin used in Examples 1 to 4 (TEFLON; KPL-610) was added in an amount illustrated in Table 1.

The same procedures as in Examples 1 to 4 were carried out to obtain the results in Table 1.

TABLE 1

| | Composition (parts by weight) | | | | | Friction coefficient | Wear coefficient × $10^{-8} \frac{cm^3 \cdot min}{kg \cdot m \cdot hr}$ |
|---|---|---|---|---|---|---|---|
| | Polyimide 100 | | | | | | |
| | Diamine | Tetracarboxylic acid dianhydride | Fluororesin | Solid lubricant | Reinforcing material | | |
| Example 1 | 4,4'-Bis(3-aminophenoxy)biphenyl | Pyromellitic dianhydride | 10 | — | — | 0.22 | 86 |
| Example 2 | 4,4'-Bis(3-aminophenoxy)biphenyl | Pyromellitic dianhydride | 30 | — | — | 0.18 | 91 |
| Example 3 | 4,4'-Bis(3-aminophenoxy)biphenyl | Pyromellitic dianhydride | 50 | — | — | 0.16 | 120 |
| Example 4 | 4,4'-Bis(3-aminophenoxy)biphenyl | Pyromellitic dianhydride | 80 | — | — | 0.14 | 125 |
| Example 5 | 4,4'-Bis(3-aminophenoxy)biphenyl | Pyromellitic dianhydride | 30 | — | — | 0.18 | 87 |
| Example 6 | 4,4'-Bis(3-aminophenoxy)biphenyl | Pyromellitic dianhydride | 30 | — | — | 0.18 | 89 |
| Example 7 | 2,2-Bis[4-(3-aminophenoxy)phenyl]propane | 3,3',4,4'-Benzophenonetetracarboxylic dianhydride | 30 | — | — | 0.17 | 86 |
| Example 8 | Bis[4-(3-aminophenoxy)phenyl]sulfide | Pyromellitic dianhydride | 30 | — | — | 0.18 | 88 |
| Example 9 | Bis[4-(3-aminophenoxy)phenyl]sulfide | Pyromellitic dianhydride | 30 | — | — | 0.17 | 89 |
| Example 10 | 4,4'-Bis(3-aminophenoxy)biphenyl | Pyromellitic dianhydride | 10 | Lead monoxide 7 | — | 0.16 | 76 |
| Example 11 | 4,4'-Bis(3-aminophenoxy)biphenyl | Pyromellitic dianhydride | 10 | Lead 7 | — | 0.14 | 68 |
| Example 12 | 4,4'-Bis(3-aminophenoxy)biphenyl | Pyromellitic dianhydride | 10 | Graphite 10 | — | 0.14 | 65 |
| Example 13 | 4,4'-Bis(3-aminophenoxy)biphenyl | Pyromellitic dianhydride | 10 | Boron nitride 7 | — | 0.15 | 65 |
| Example 14 | 4,4'-Bis(3-aminophenoxy)biphenyl | Pyromellitic dianhydride | 10 | Molybdenum disulfide 7 | — | 0.16 | 62 |
| Example 15 | 4,4'-Bis(3-aminophenoxy)biphenyl | Pyromellitic dianhydride | 10 | — | Glass fibre 20 | 0.23 | 50 |
| Example 16 | 4,4'-Bis(3-aminophenoxy)biphenyl | Pyromellitic dianhydride | 10 | — | Carbon fibre 20 | 0.20 | 32 |
| Example 17 | 4,4'-Bis(3-aminophenoxy)biphenyl | Pyromellitic dianhydride | 10 | — | Aromatic polyamide fibre 20 | 0.18 | 32 |
| Example 18 | 4,4'-Bis(3-aminophenoxy)biphenyl | Pyromellitic dianhydride | 10 | — | Potassium titanate fibre 20 | 0.18 | 31 |
| Comparat. Example 1 | 4,4'-bis(3-aminophenoxy)biphenyl | Pyromellitic dianhydride | 0 | — | — | 0.46 | 450 |
| Comparat. Example 2 | 4,4'-bis(3-aminophenoxy)biphenyl | Pyromellitic dianhydride | 3 | — | — | 0.44 | 450 |
| Comparat. Example 3 | 4,4'-bis(3-aminophenoxy)biphenyl | Pyromellitic dianhydride | 120 | — | — | 0.12 | 3650 |

What is claimed is:

1. A polyimide resin composition which comprises 100 parts by weight of a polyimide consisting of recurring units of the formula:

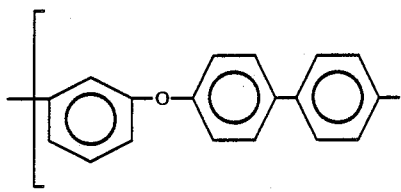

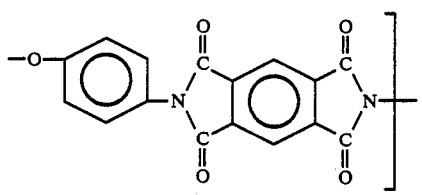

and from 5 to 100 parts by weight of a fluororesin selected from the group consisting of polytetrafluoroethylene, tetrafluoroethylene hexafluoropropylene copolymer, tetrafluoroethylene perfluoroalkylvinyl ether copolymer, ethylene tetrafluoroethylene copolymer, ethylene chlorotrifluoroethylene copolymer and polyvinylidene fluoride.

2. The polyimide resin composition as claimed in claim 1 wherein the fluororesin is polytetrafluoroethylene.

3. A polyimide resin composition which comprises 100 parts by weight of a polyimide having recurring units of the formula:

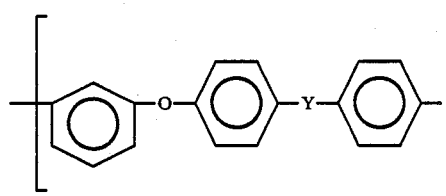

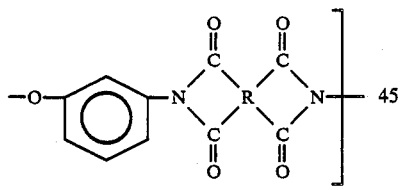

wherein Y is a radical selected from the group consisting of a bond, divalent hydrocarbon radical having from 1 to 10 carbon atoms, hexafluorinated isopropylidene radical, carbonyl radical, thio radical, sulfinyl radical, sulfonyl radical and oxide, and R is a tetravalent radical selected from the group consisting of aliphatic radical having 2 and more carbon atoms, alicyclic radical, monoaromatic radical, condensed polyaromatic radical, and non-condensed polyaromatic radical wherein aromatic radicals are linked to one another direct or via bridge members, and from 5 to 100 parts by weight of a fluororesin selected from the group consisting of polytetrafluoroethylene, tetrafluoroethylene hexafluoropropylene copolymer, tetrafluoroethylene copolymer, ethylene chlorotrifluoroethylene copolymer and polyvinylidene fluoride.

4. The polyimide resin composition as claimed in claim 3 wherein Y is a radical selected from the group consisting of a bond, isopropylidene radical and thio radical.

5. The polyimide resin composition as claimed in claim 3 wherein Y is isopropylidene radical.

6. The polyimide resin composition as claimed in claim 3 wherein Y is thio radical.

7. The polyimide resin composition as claimed in claim 3 wherein R is a tetra-valent radical selected from the group consisting of

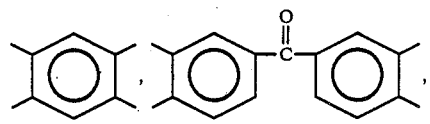

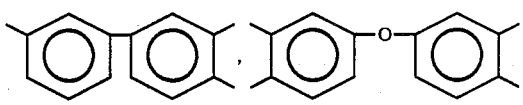

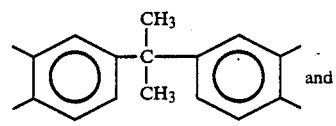

and

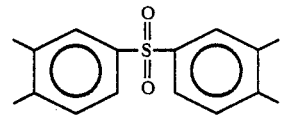

8. The polyimide resin composition as claimed in claim 1 wherein R is tetra-valent radical

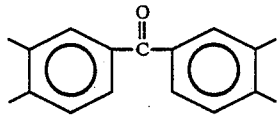

* * * * *

UNITED STATES PATENT AND TRADEMARK OFFICE
CERTIFICATE OF CORRECTION

PATENT NO. : 4,816,516

DATED : March 28, 1989

INVENTOR(S) : YAMAYA et al.

It is certified that error appears in the above-identified patent and that said Letters Patent is hereby corrected as shown below:

Column 11,
Claim 1, the formula should be corrected to read as follows:

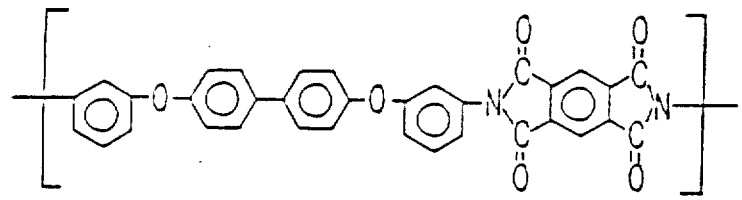

Signed and Sealed this

Twelfth Day of May, 1992

Attest:

DOUGLAS B. COMER

Attesting Officer

Acting Commissioner of Patents and Trademarks